April 30, 1968     G. LE ROY     3,380,303

SIGHT GLASS FOR REACTION VESSELS

Filed Oct. 22, 1965

INVENTOR
GENE LE ROY

BY Cushman, Darby & Cushman
ATTORNEYS

April 30, 1968  G. LE ROY  3,380,303
SIGHT GLASS FOR REACTION VESSELS
Filed Oct. 22, 1965

INVENTOR
GENE LE ROY
BY Cushman, Darby & Cushman
ATTORNEYS

_United States Patent Office_

3,380,303
Patented Apr. 30, 1968

3,380,303
SIGHT GLASS FOR REACTION VESSELS
Gene Le Roy, Rte. 1, Box 510, Maplewood Estates,
Scott Depot, W. Va. 25560
Filed Oct. 22, 1965, Ser. No. 502,660
4 Claims. (Cl. 73—334)

The present invention relates to sight glasses used with enclosed vessels and the like. More particularly it relates to an improvement of the sight glass of my U.S. Patent 3,148,543.

A sight glass is a device secured over an opening in a vessel to permit inspection of the contents. Similar devices also are used as windows for ships which are submerged in water. Generally, the glass comprises a lens and associated parts which hold it against the rim around the opening.

The lens frequently is a laminate comprising one or more layers of tempered glass, selected for high strength, and a layer of untempered glass which is resistant to attack by corrosive elements. Two layers of tempered glass are preferred because tempered glass, which is under internal stress, has a tendency to rupture. That is, the chances of damage which might result from rupturing of a tempered glass lens are reduced by using two layers because it is highly unlikely that both layers will rupture at the same time. The several layers of glass are cemented together with a clear adhesive.

In the aforesaid U.S. Patent, 3,148,543, there is disclosed an improvement in the mounting means used to secure the lens to a vessel which reduces externally applied stresses on the tempered glass lenses. The device disclosed therein comprises a lens holding sleeve or ferrule and a mounting ring or support which holds the ferrule to the vessel. The ferrule has an internal bore which receives the lens elements and an internal flange or lip, extending into the bore near its inner end, against which the lens is seated. The mounting ring overlies the other end of the bore and presses the lens toward that internal flange. Gaskets are provided at the ends of the lens, between it and the internal flange at the inner end and between it and the mounting ring at the other end.

The mounting ring also is arranged to press the ferrule against the vessel. That is, in addition to pressing against a gasket at the end of the lens, it presses directly against a portion of the ferrule and in turn presses it against the vessel. The arrangement is such that when the mounting ring presses directly against a part of the ferrule, there is a definite space between it and the outer ends of the lens and the ferrule for the aforesaid gasket. The gasket is sufficiently thick to fill that space, but sufficiently thin and/or compressible that the mounting ring can be pressed directly against the ferrule. Thus the pressure applied against the lens itself is controlled. That is, when the ring is tightened against the ferrule, it also is pressed against the gasket with increasing pressure. However, when the ring is tightened sufficiently that it is in direct contact with a portion of the ferrule, it cannot be tightened further against the gasket and there is a definite limit on the pressure applied to the gasket.

In the specific embodiment illustrated and described in the aforesaid patent, the direct contact between the ferrule and the ring is achieved by providing an outwardly-extending flange near the inner end of the ferrule. This construction was quite useful because it was adapted for use with a common type of vessel opening as a replacement for other types of sight glass.

The present invention has as one of its principal objects the application of the principles of the aforesaid patent to a different type of vessel opening in which the sight glass is intended to extend into the opening. Ordinarily, there is a pad welded in the opening providing bolts to hold the sight glass, and the pad has an opening in which the lens is inserted. This object is achieved by the omission from the ferrule of the outwardly-extending flange at the inner end of the ferrule so that it may be inserted in the vessel. The construction of the ferrule near its outer end and of the compression ring is such that they abut in direct contact to provide the desired limitation of pressure on the gaskets at the ends of the lens.

A more complete understanding of how the present invention achieves its objects may be obtained by consideration of the following detailed description of preferred embodiments and the drawings. In this description, reference will be made to the inner and outer ends of the lens, etc. It will be appreciated that these terms are used for convenience, and that no limitation on the scope of the invention is intended.

Figure 1:
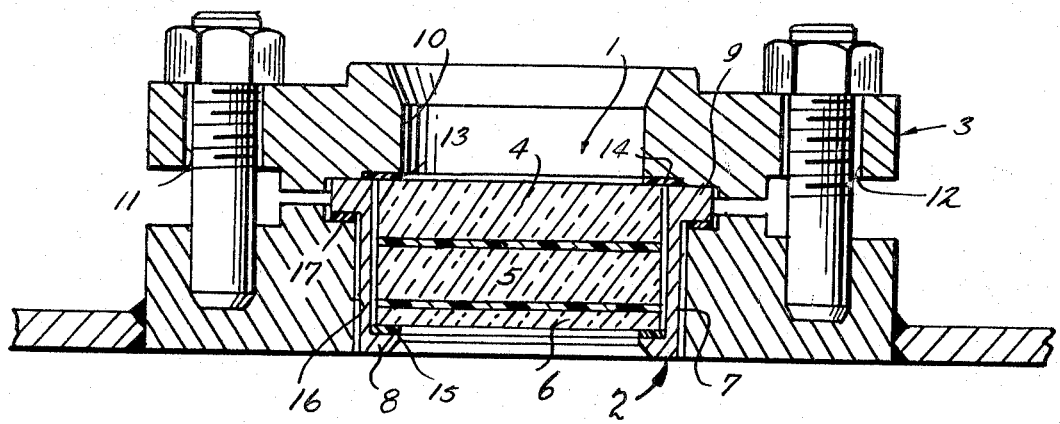
FIG. 1 is a cross-sectional elevation through a sight glass which embodies the invention, showing its attachment to a vessel.

In FIG. 1 there is shown a sight glass which comprises three principal parts, a lens assembly 1, a ferrule 2 and a compression ring 3.

The lens assembly comprises two layers of tempered glass 4 and 5 and a layer of untempered corrsion resistant glass such as borosilicate glass 6 held together by intermediate layers of cement, which, for purposes of illustration will be referred to as epoxy resin.

The ferrule 2 is a cylindrical tube 7 around the lenses which has a diameter less than the opening in the vessel in which the ferrule is to be inserted. At its inner end, the tube has an internal flange 8 which provides a seat for the lens assembly. An external, laterally-extending flange 9 is provided at the outer end of the ferrule which has a diameter greater than the opening in the vessel.

The compression ring 3 has a central opening 10 having a smaller diameter than the lens 1 and therefore overlies the edge of the lens. Near the outer edges of the ring, holes 11 and 12 are provided for bolts used in tightening the compression ring against the ferrule.

Figure 4:
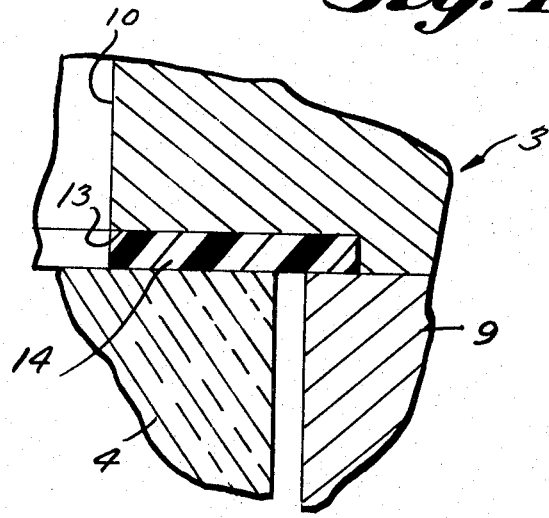
FIG. 4 is an enlarged view in cross-section of a portion of the sight glass of FIG. 1.

As shown best in FIG. 4, there is an annular groove or recess 13 in the undersurface of the compression ring 3 to receive a gasket 14. The outside diameter of the groove 13 is greater than the inside diameter of the ferrule 2 but less than the outside diameter of the ferrule so that the groove overlies a portion of the ferrule but permits direct contact between the ferrule and the compression ring. The inner diameter of the groove is less than the diameter of the lens 1 so that the gasket 14 also overlies the lens. Conveniently, the groove extends to the central opening 10 of the compression ring.

In use, the lens 1 is placed in the ferrule 2 with a gasket 15 between it and the flange 8. As shown in FIG. 1, there is a space between the lens and the inside of the tubular portion 7 of the ferrule, but this space may be filled, e.g., with a packing. Then the ferrule is placed in the opening 16 in the vessel, a gasket 17 being positioned under the flange 9. The gasket 14 is inserted and the compression ring is bolted over the ferrule. The gasket 14 is sufficiently thin and/or compressible that the compression ring can be tightened against the ferrule.

The arrangement is such that the compression ring 3 is pressed against the gaskets 14 and 15 until it comes in contact with the flange 9 of the ferrule. Then, no matter how much more pressure is applied against the gasket 17 by tightening the bolts, substantially no further pressure is applied to gaskets 14 and 15. As a result, the pressure on the lens cannot exceed a predetermined amount. Expressed in another way, the upper end of the ferrule is in direct contact with the compression ring and functions as a stop against which the compression ring abuts. Therefore, it is possible to insert the lens into the opening in the vessel and nevertheless employ the principles disclosed in the aforesaid U.S. patent for control of pressure on the lens.

Ordinarily, the lens 1 does not extend above the top of the ferrule 2 before pressure is applied. This provides better control on the pressure applied to the lens.

Figure 2:
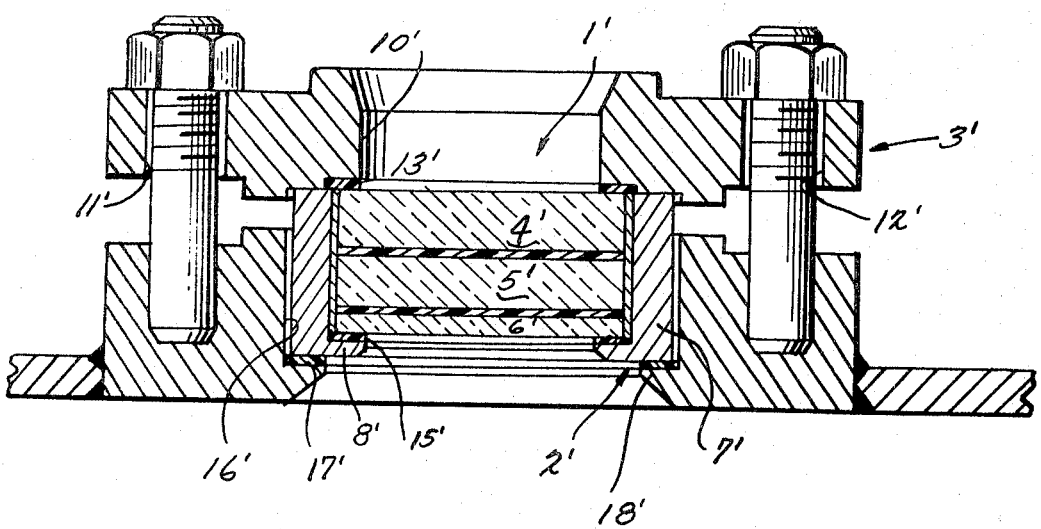
FIG. 2 is a cross-sectional elevation of another form of sight glass which embodies the invention showing its attachment to a vessel.
Figure 3:
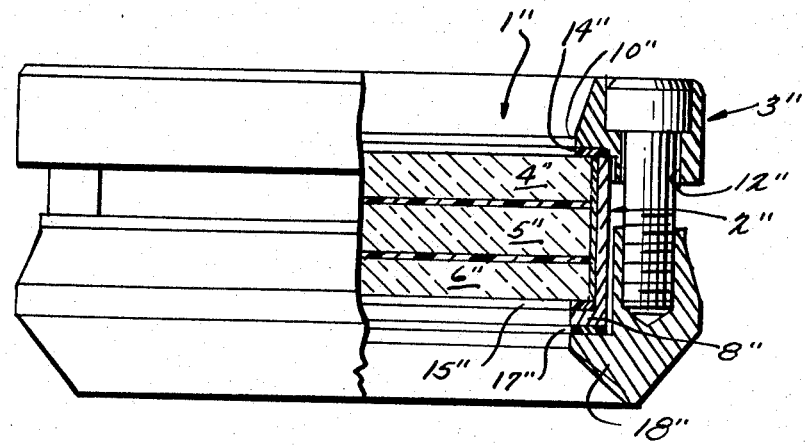
FIG. 3 is a similar view of a third embodiment.

The embodiments illustrated in FIGS. 2 and 3 are suitable for use with a vessel whose sight glass opening has a ledge 18′ or 18″ against which the lens and ferrule may rest. In these embodiments, the flange 9 is omitted and the gasket 17 is positioned on the ledge (18′ in FIG. 2 and 18″ in FIG. 3) under the inner end of the ferrule. In all other respects, the structural arrangements and mode of operation are equivalent. Therefore, the same numerals have been applied in FIGS. 2 and 3, single and double prime notations being used to provide a suitable distinction. Preferably, in the embodiments, the ferrule should be fairly thick and stiff so that it does not flex substantially when pressure is applied by the compression ring.

The invention provides in the above embodiments a groove in the compression ring for the gasket which overlies a portion only of the ferrule and the edge portion of the lens, another portion of the compression rings which is over the ferrule not having a groove. Therefore, when the compression ring is in place and tightened, it will make direct contact with the ferrule and provide controlled pressure on the gaskets at the ends of the lens.

Figure 5:
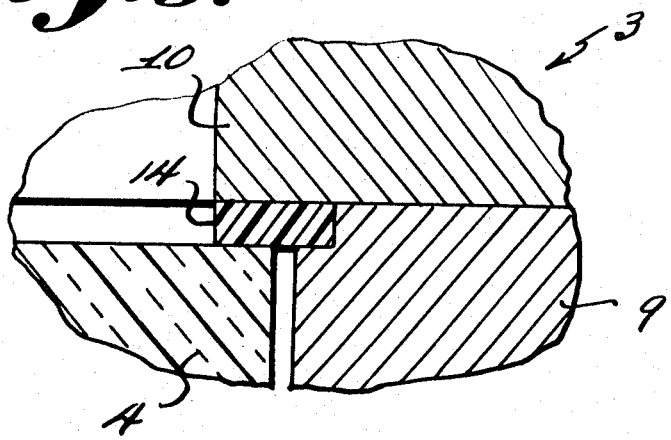
FIG. 5 is a cross-section of a portion of a modified form of the sight glass of FIGS. 1 and 4.
Figure 6:
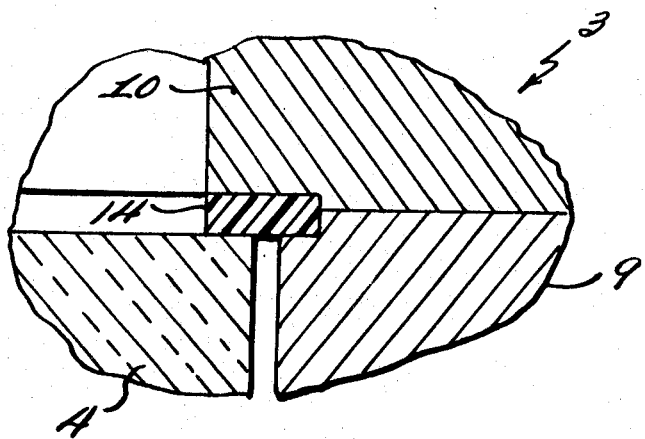
FIG. 6 is a cross-section of a portion of another modified form of the sight glass of FIGS. 1 and 4.

Similar effects may be accomplished by having an annular groove at the edge of the top of the ferrule as shown in FIG. 5, or annular grooves in both the compression ring and the ferrule as in FIG. 6. (The same numerals as in FIGS. 1 and 4 have been applied to corresponding parts in FIGS. 5 and 6.)

In these cases, however, the top of the lens ordinarily will be opposite the bottom of the groove in the ferrule rather than the top of the ferrule. That is, ordinarily, the lens will not project into the space provided by the groove(s) for the gasket.

Various other embodiments may incorporate the invention, and changes also may be made in details of construction and mode of operation of the embodiments illustrated without departing from the scope of the invention. It will be appreciated that it is intended that the scope of the invention be limited only as set forth in the appended claims.

I claim:

1. A sight glass for reaction vessels and the like comprising a lens, a ferrule receiving said lens, a gasket at one end of the lens and ferrule, compression means overlying said end of the gasket and ferrule, and means for pressing said compression means against said end of the ferrule and said gasket, there being a groove between a portion only of said compression means and a portion only of said end of the ferrule to receive said gasket so that, when said compression means is pressed against said gasket and said ferrule, another portion of the compression means will be in direct contact with another portion of said end of the ferrule, thereby limiting pressure against said gasket.

2. A sight glass as set forth in claim 1 in which said groove is in said ferrule.

3. A sight glass as set forth in claim 2 in which there is an internal flange at the other end of said ferrule against which said lens is seated and there is a gasket between the lens and said internal flange.

4. A sight glass as set forth in claim 1 in which said ferrule has a laterally outwardly extending flange at said end to be seated on the rim surrounding an opening in a vessel.

References Cited
UNITED STATES PATENTS

| | | | |
|---|---|---|---|
| 2,201,542 | 5/1940 | Kinderman | 73—330 |
| 3,170,326 | 2/1965 | Knecht | 73—330 |
| 3,345,871 | 10/1967 | Andrea | 73—331 |
| 3,345,872 | 10/1967 | Meginnis | 73—334 |

LOUIS R. PRINCE, *Primary Examiner.*

DANIEL M. YASICH, *Assistant Examiner.*